United States Patent
Meguro

(10) Patent No.: US 7,246,598 B2
(45) Date of Patent: *Jul. 24, 2007

(54) ACCELERATOR PEDAL DEVICE

(75) Inventor: Haruo Meguro, Miyagi (JP)

(73) Assignee: Keihin Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/263,968

(22) Filed: Nov. 2, 2005

(65) Prior Publication Data

US 2007/0095163 A1    May 3, 2007

(51) Int. Cl.
*F02D 11/10* (2006.01)
*F02D 11/00* (2006.01)

(52) U.S. Cl. .................... 123/399; 74/513; 74/514

(58) Field of Classification Search ............ 123/399, 123/406.74, 342, FOR. 108; 74/512, 513, 74/514, 527, 529, 560
See application file for complete search history.

(56) References Cited

U.S. PATENT DOCUMENTS

| | | | | |
|---|---|---|---|---|
| 5,293,976 A * | 3/1994 | Naruse | .................. | 477/211 |
| 5,385,068 A * | 1/1995 | White et al. | .................. | 74/512 |
| 5,416,295 A * | 5/1995 | White et al. | .............. | 200/86.5 |
| 5,529,296 A | 6/1996 | Kato et al. | | |
| 5,937,707 A * | 8/1999 | Rixon et al. | .................. | 74/560 |
| 6,070,490 A * | 6/2000 | Aschoff et al. | .............. | 74/513 |
| 6,134,987 A * | 10/2000 | Kalsi | ............................ | 74/560 |
| 6,276,229 B1 * | 8/2001 | Gohring et al. | ............... | 74/513 |
| 6,289,762 B1 * | 9/2001 | Silva | ............................ | 74/513 |
| 6,626,061 B2 * | 9/2003 | Sakamoto et al. | ............ | 74/512 |
| 6,857,336 B2 * | 2/2005 | Staker | ........................ | 74/513 |
| 7,017,443 B2 * | 3/2006 | Kalsi | ........................... | 74/514 |
| 7,051,616 B2 * | 5/2006 | Yokochi et al. | ............... | 74/513 |
| 2004/0045393 A1 * | 3/2004 | DeForest | ..................... | 74/514 |
| 2005/0034555 A1 * | 2/2005 | Staker | ........................ | 74/513 |
| 2005/0247158 A1 * | 11/2005 | Willemsen et al. | ........... | 74/513 |
| 2006/0112931 A1 * | 6/2006 | Meguro | ..................... | 123/399 |
| 2006/0117902 A1 * | 6/2006 | Martin et al. | .................. | 74/512 |
| 2006/0179972 A1 * | 8/2006 | Peniston et al. | .............. | 74/560 |
| 2006/0185466 A1 * | 8/2006 | Richardson et al. | .......... | 74/560 |

FOREIGN PATENT DOCUMENTS

| | | |
|---|---|---|
| JP | 11-343882 A | 12/1999 |
| JP | 2002-283872 A | 10/2002 |

* cited by examiner

*Primary Examiner*—Mahmoud Gimie
(74) *Attorney, Agent, or Firm*—Birch, Stewart, Kolasch & Birch, LLP

(57) ABSTRACT

An accelerator pedal device is fixed through a housing to a car body. By pedaling on an accelerator pedal arm supported pivotally by the housing, the accelerator pedal arm and a interlocking member rotationally move integrally, and by a torsion spring provided between an accelerator pedal arm and a interlocking member, press force is applied to a detection part provided in the housing. The press force is output as an electric signal from the detection part through a controller to a drive part, whereby opening of a throttle valve is controlled.

22 Claims, 5 Drawing Sheets

ACCELERATOR PEDAL DEVICE

BACKGROUND OF THE INVENTION

1. Field of the Invention

The present invention relates to a cable-less accelerator pedal device adaptable to a vehicle, and more particularly to an accelerator pedal device including a detecting unit detecting a pedaling amount of an accelerator pedal.

2. Description of the Background Art

In a vehicle such as an automobile, conventionally, in place of an accelerator pedal device using an accelerator cable that connects a throttle valve for controlling the volume of intake air inspired in an internal combustion engine and an accelerator cable, a cable-less accelerator pedal device has been adopted, which electrically detects the pedaling amount of the accelerator pedal and controls an opening amount of the throttle valve.

In this accelerator pedal device, a rotation angle sensor is provided on a rotation shaft that functions as a supporting point of the rotational operation of the accelerator pedal, the pedaling amount of the accelerator pedal detected by the rotation angle sensor is converted into an electric signal, thereafter the electric signal is transmitted through a control part to a drive source, and the drive source controls an opening amount of the throttle valve whereby the volume of the intake air inspired in the internal combustion engine is controlled.

In this case, in such the accelerator pedal device, a return spring member for returning the accelerator pedal to a full closing position thereof is provided. When a driver lowers pedaling force onto the accelerator pedal, the accelerator pedal is returned by elastic force of the return spring member to the full closing position that is an initial position of the accelerator pedal (refer to, for example, Japanese Patent Unexamined Publication JP-A-11-343882).

On the other hand, in the accelerator pedal device that controls the opening amount of the throttle valve by the conventional accelerator cable, when the driver depresses on the accelerator pedal against the elastic force of a return spring provided on the throttle valve, reaction force is produced, and sliding resistance by the accelerator cable is generated when the driver treads on-and-off the accelerator pedal. In the cable-less accelerator pedal device, the return spring member is provided in place of the return spring provided on the throttle valve, whereby the reaction force when the driver treads on the accelerator pedal is produced. However, the sliding resistance by the accelerator cable is not generated when the driver tread the accelerator pedal on-and-off.

As a result, when the driver changes a vehicle from a vehicle adopting the conventional accelerator pedal device to a vehicle adopting the cable-less accelerator pedal device, the driver feels differences in operation of the accelerator pedal. Therefore, the cable-less accelerator pedal device adopts a hysteresis generation mechanism that causes intendedly resistant feeling resemblant to the sliding resistance by the accelerator cable (refer to, for example, Japanese Patent Unexamined Publication JP-A-2002-283872)

In the JP-A-11-343882, it is necessary to provide the rotation angle sensor for detecting the pedaling amount of the accelerator pedal (that is, the rotation amount thereof) so as to be coaxial with the rotation shaft that supports the accelerator pedal. Therefore, there is a problem that the dimension in the width direction that is nearly orthogonal to an axis of the accelerator pedal in the accelerator pedal device increases, which makes the size of the accelerator pedal device large. Specifically, the width dimension near the rotation shaft in the accelerator pedal device increases.

Further, the rotation angle sensor is provided, for example, between the accelerator pedal that is a rotary part in the accelerator pedal device and a body that is a fixed part. Therefore, there is required adjustment works such as position-matching with the accelerator pedal and the body. Therefore, there is a problem that the attachment work of the rotation angle sensor becomes complicated, which causes the increase of the manufacturing pedals of the accelerator pedal device. Particularly, in case that a Hall element type sensor is adopted as the rotation angle sensor, when a magnetic (for example, permanent magnet) provided for the accelerator pedal is detected by the Hall element, there is a problem that detection accuracy lowers because of position mismatching between the magnetic and the Hall element that is a detection part and unsteadiness in the radial direction that is nearly orthogonal to the rotary direction.

Further, since the rotation angle sensor converts the pedaling amount of the accelerator pedal into the rotation angle (rotation amount), it must have rotation stroke according to the rotation amount of the accelerator pedal. Therefore, there is fear that in the accelerator pedal having large rotation amount, the rotation angle sensor will be made large correspondingly, and the structure of the rotation angle sensor will be complicated.

SUMMARY OF THE INVENTION

The invention has been made in view of the above various problems. One of objects of the invention is to provide an accelerator pedal device that simplifies its constitution thereby to perform size-reduction, and can secure easiness of its manufacture.

In order to achieve the object, according to a first aspect of the present invention, there is provided an accelerator pedal device comprising:

a body;

an accelerator pedal rotatably supported on the body, and applied pedaling force from a driver;

a torsion spring provided around a rotational axis of the accelerator pedal, and converting a rotational displacement of the accelerator pedal into press force of the torsion spring;

a detection part provided on the body and detecting the press force applied by the torsion spring as a pressure value; and a throttle valve control unit controlling an opening amount of a throttle valve in accordance with the detected pressure value.

According to the first aspect of the present invention, the torsion spring is provided at the rotational axis of the accelerator pedal, when the driver pedals the accelerator pedal to rotate, the press force of the torsion spring applies to the detecting part, whereby the pressure value of the press force is detected. That is, by transmission of the rotational displacement of the accelerator pedal to the torsion spring, the rotational displacement is converted by the torsion spring into the press force and transmitted to the detection part.

Therefore, compared with the case where the rotation amount of the accelerator pedal is detected by the conventional rotation angle sensor, since appropriate magnitude of the press force corresponding to the pedaling amount of the accelerator pedal is applied to the detection part by the torsion spring, the value on the basis of the pedaling amount can be detected with high accuracy by the detection part. Further, the constitution of the detection part in the present invention can be simplified compared with the conventional rotation angle sensor. Therefore, since the size of the accelerator pedal device can be reduced, and the detection part can be readily assembled to the body, assembly workability can be improved.

Further, according to a second aspect of the present invention, as set forth in the first aspect of the present invention, it is preferable that the accelerator pedal comprises:

a pedal arm provided with a pedal portion, to which the pedaling force is applied, on a first end side;

an interlocking member engaged with a second end side of the pedal arm and rotating integrally with the pedal arm; and a hysteresis generating mechanism comprising:

a first engagement part formed on the pedal arm; and a second engagement part formed on the interlocking member so as to oppose to the first engagement part and engage with the first engagement part, wherein when the pedal arm rotates, the hysteresis generating mechanism divides a rotation force of the pedal arm into rotation force of the interlocking member and axial force in an axial direction substantially orthogonal to a rotation direction of the interlocking member, and the hysteresis generating mechanism generates frictional resistance on the accelerator pedal when the accelerator pedal is pedaling and also the accelerator pedal is returning therefrom.

That is, when the driver pedals on the pedal arm, a movement of the interlocking member is divided into a rotational movement which integrally moves with the pedal arm and an linear movement which separating the pedal arm from the interlocking member by the torsion spring. The linear movement is caused by sliding both of the first engagement part formed at either the pedal arm or the interlocking member and the second engagement part that is opposed to the first engagement part while contacting each other due to the elastic force of the torsion spring. Hereby, the pedal arm and/or the interlocking member moves in the direction where they separate from each other and comes into contact with the body, and the pedal arm and/or the interlocking member moves rotationally in a contacting state with the body. Thus, the rotational force of the pedal arm is divided into the rotational force and the axial force thereof.

Therefore, when the driver controls the pedaling force on the pedal arm, the friction resistance is produced by the hysteresis generating mechanism and the torsion spring in both the pedaling direction of the pedal arm and the return direction thereof, so that hysteresis can be generated similarly to the conventional accelerator pedal device in which the accelerator pedal and the throttle valve are connected by the accelerator wire.

Furthermore, according to a third aspect of the present invention, as set forth in the second aspect of the present invention, it is preferable that a first end portion of the torsion spring is fixed to the pedal arm or the interlocking member, and a second end portion of the torsion spring is fixed to a detection part side of the body.

Thus, since the both ends of the torsion spring are engaged respectively with the pedal arm or the interlocking member, and the detection part, the constitution of the members engaging with the torsion spring can be simplified. Therefore, the size of the device can be reduced, and the conversion mechanism for converting the rotation amount of the pedal arm and the interlocking member into the press force is unnecessary, so that the device can be manufactured at a low cost.

In addition, according to a fourth aspect of the present invention, as set forth in the first aspect of the present invention, it is preferable that the torsion spring is arranged coaxially with the center of the rotational axis of the pedal arm, and the elastic force of the torsion spring biases the accelerator pedal in the direction where the accelerator pedal is returned to an initial position to which the pedaling force is not applied.

Hereby, compared with the case where the rotation angle sensor is provided coaxially with the rotation shaft in the conventional accelerator pedal, the dimension in the width direction of the body can be reduced. Therefore, rigidity of the body can be heightened, and rigidity of the accelerator pedal device can be improved. Further, without increasing the dimension in the width direction of the accelerator pedal device, the size of the accelerator pedal device can be reduced, so that the degree of freedom in layout can be increased.

Also, according to a fifth aspect of the present invention, as set forth in the first aspect of the present invention, it is preferable that the detection part comprises a pressure sensor being capable of converting the pressure value of the press force into an electric signal, the pressure sensor is attached to an attachment hole formed on the body, and a wiring connected to the pressure sensor and a connection terminal part connected to the wiring are formed integrally with the body.

Thus, by adopting the pressure sensor functioning as the detection part, it is possible to convert the press force applied by the accelerator pedal into the electric signal appropriately to control the throttle vale. Further, since the pressure sensor can be readily attached into the attachment hole of the body, the detection part can be manufactured separately from the accelerator pedal. Therefore, after the accelerator pedal has been assembled to the body, the detection part previously unitized may be set.

Further, since the wiring connected to the pressure sensor and the connection terminal connected to the wiring are formed integrally with the body, simply by only attaching the pressure sensor into the attachment hole, the pressure sensor can be connected to the wiring and the connection terminal. Therefore, the complicated works such as position-matching of the pressure sensor with the body and connection of the pressure sensor to the wiring become unnecessary, so that assembly workability of the accelerator pedal device can be improved.

According to a sixth aspect of the present invention, as set forth in the second aspect of the present invention, it is preferable that the first engagement part comprising a slant surface which is slant relative to a plane orthogonal to a rotational axis of the accelerator pedal, the second engagement part comprising a slant surface which is slant relative to the plane orthogonal to the rotational axis of the accelerator pedal, and the first engagement part contacts with the second engagement part on the respective slant surfaces.

According to a seventh aspect of the present invention, as set forth in the second aspect of the present invention, it is preferable that at least one of protrusions is formed on either the first engagement part or the second engagement part, the protrusion comprising:

a slant surface which is slant relative to a plane orthogonal to a rotational axis of the accelerator pedal; and an orthogonal surface which is orthogonal to the plane orthogonal to the rotational axis of the accelerator pedal;

wherein the slant surface and the orthogonal surface are arranged around the rotational axis of the accelerator pedal, and at least one of grooves is formed on either the second engagement part or the first engagement part, of which shape corresponds to a shape of the protrusion so as to engage with the protrusion.

According to an eighth aspect of the present invention, as set forth in the second aspect of the present invention, it is preferable that a friction surface is formed on either the pedal arm or the interlocking member, a swollen portion is formed on the body so as to oppose to the friction surface, and when the accelerator pedal does not rotate, a predetermined clearance is defined between the friction surface and the swollen portion and when the accelerator pedal rotates, the friction surface slides against the swollen portion while the friction surface contacting with the swollen portion.

According to a ninth aspect of the present invention, as set forth in the first aspect of the present invention, it is preferable that the torsion spring applies reaction force against the pedaling force of the driver.

According to a tenth aspect of the present invention, as set forth in the second aspect of the present invention, it is preferable that the torsion spring is disposed between the pedal arm and the interlocking member.

According to an eleventh aspect of the present invention, as set forth in the second aspect of the present invention, it is preferable that a first end of the torsion spring is engaged with either the pedal arm or the interlocking member, and a second end of the torsion spring is engaged with the body.

According to twelfth sixth aspect of the present invention, as set forth in the first aspect of the present invention, it is preferable that the accelerator pedal further comprising:

a guide member transmitting the press force of the torsion spring to the detection part, comprising:

a first surface with which a first end of the torsion member abuts; and a second surface pressing the detection part due to the press force of the torsion spring.

According to a thirteenth aspect of the present invention, there is provided a vehicle comprising the accelerator pedal device as set forth in the first aspect of the present invention.

According to a fourteenth aspect of the present invention, as set forth in the second aspect of the present invention, it is preferable that the pedaling force drives the hysteresis generating mechanism to generate the frictional resistance.

Note that it is preferable that the throttle valve control unit controls the opening amount of the throttle valve in accordance with only the detected pressure valve.

According to the invention, the following advantage can be obtained.

The accelerator pedal is rotated by the pedaling force of the driver, whereby the rotational displacement of the accelerator pedal is converted by the elastic displacement of the torsion spring into the press force, and the press force that represents the pressure value corresponding to the pedaling amount of the accelerator pedal can be detected by the detection part. Therefore, compared with the case where the rotation amount of the accelerator pedal is detected by the conventional rotation angle sensor, the pedaling amount of the accelerator pedal can be detected as the pressure value by the detection part with high accuracy, and the constitution of the detection part can be simplified. Therefore, the size of the accelerator pedal device can be reduced, and the assembly workability can be improved.

DETAILED DESCRIPTION OF THE PREFERRED EMBODIMENTS

A preferred embodiment of the accelerator pedal device according to the invention will be described below in detail with reference to attached drawings.

Figure 1:
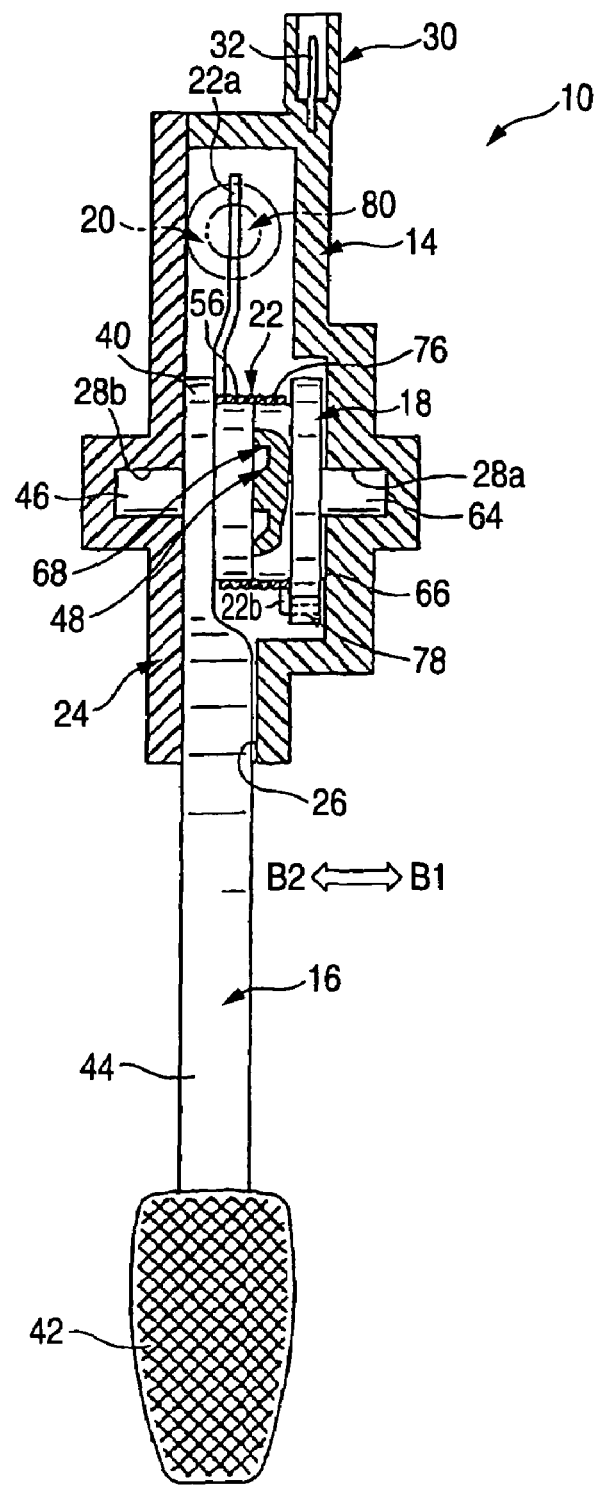
FIG. 1 is a front partially sectional view of an accelerator pedal device according to an embodiment of the invention.
Figure 2:
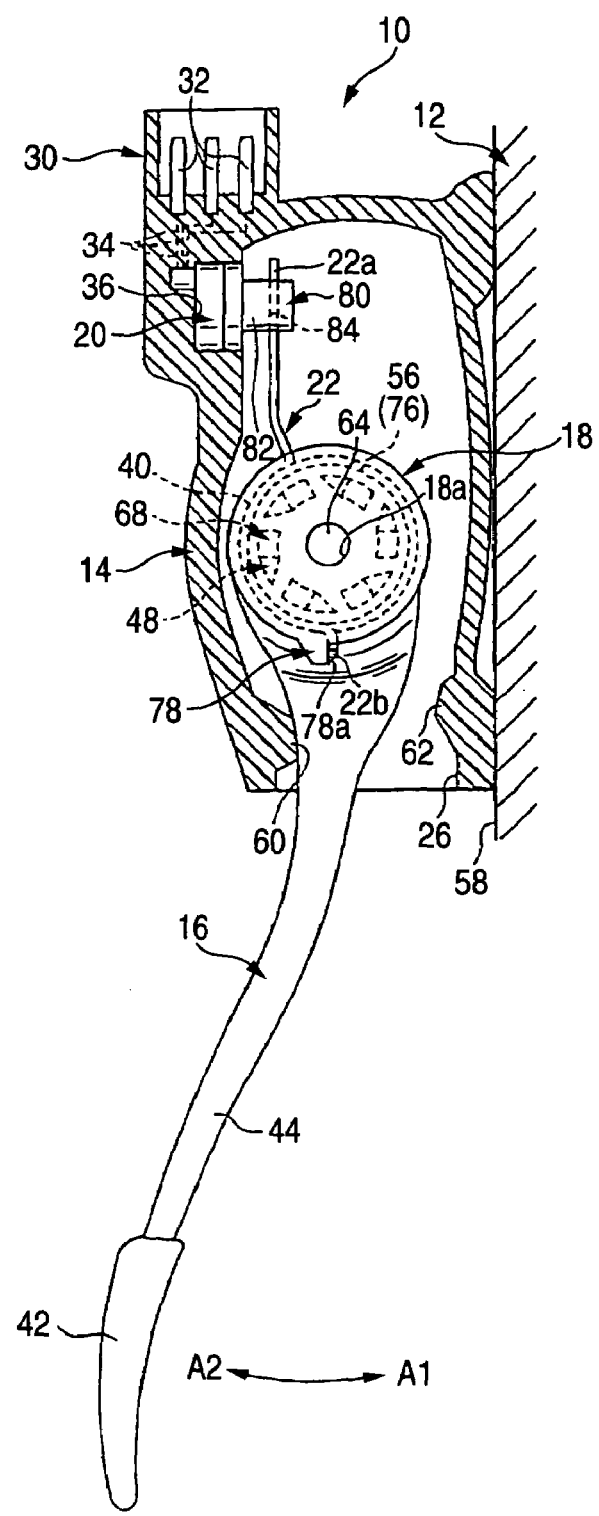
FIG. 2 is a side partially sectional view of the accelerator pedal device in FIG. 1.

In FIGS. 1 and 2, reference numeral 10 represents an accelerator pedal device according to an embodiment of the invention.

This accelerator pedal device 10 comprises a housing (body) 14 fixed to a car body 12 (refer to FIG. 2) in a vehicle such as an automobile; an accelerator pedal arm (pedal arm) 16 supported pivotally in the housing 14; an interlocking member 18 that is provided on the housing 14 and rotationally moves integrally with the accelerator pedal arm 16 under rotational action of the accelerator pedal arm 16; a detection part 20 for detecting the rotational movement amount of the accelerator pedal arm 16; and a torsion spring 22 that converts the rotation amount of the accelerator pedal arm 16 into press force and applies the press force to the detection part 20.

The housing 14 is, for example, formed of a resin material, and to one side surface thereof, a cover member 24 (refer to FIG. 1) is attached. The housing 14, by attachment of the cover member 24, has the hollow shape having an opening portion 26 that opens on one side, and is fixed to the car body 12 so that the opening portion 26 is located downward as shown in FIG. 2. Further, as shown in FIG. 1, on an inner wall surface in the nearly central portion of this housing 14, a pin hole 28a is formed; and also in the cover member 24, a pin hole 28b is formed similarly in the position opposed to the pin hole 28a (refer to FIG. 1).

Figure 4:
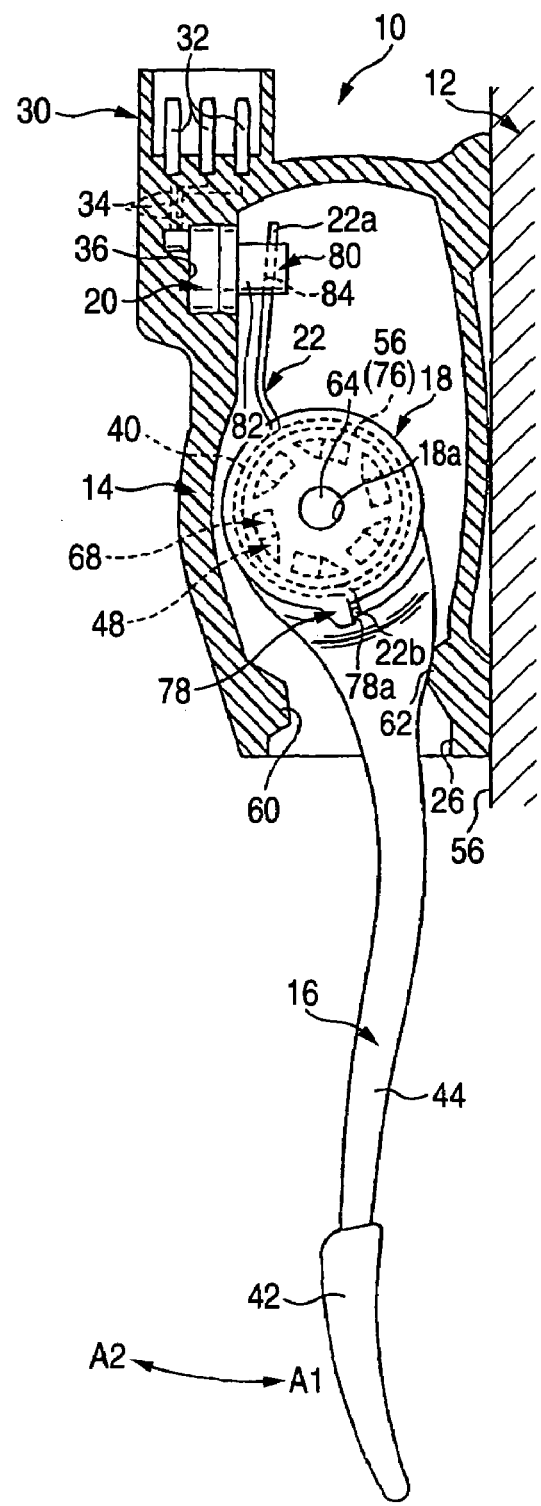
FIG. 4 is a side partially sectional view showing a state where an accelerator is full opening by pedaling on a pedal portion toward the car body side in the accelerator pedal device in FIG. 2.

Further, at the upper portion of the housing 14, as shown in FIGS. 2 and 4, a connector connection part 30 that is connected to a controller 38 (refer to FIG. 5) described later is integrally formed, and plural terminals 32 provided in the connection part 30 are respectively connected to the detection part 20 through lead wires 34. The connection part 30 and the terminal 32 function as a connection terminal part.

Further, near the connection part 30 in the housing 14, an attachment hole having the predetermined depth 36 is formed in the inner wall surface of the housing 14, and the detection part 20 is provided in the attachment hole 36. In the connection part 30, the connector and the lead wire 34 connected to the connector may be molded integrally with the housing 14.

This detection part 20 has a pressure sensor that can convert the pressure applied to the detection part 20 from the outside into an electric signal, and a pressure value detected by the pressure sensor is output as a detection signal from the connection part 30 to the controller 38 (refer to FIG. 5) provided on the outside thereof. As this pressure sensor, for example, a strain gauge may be adopted. In this case, the strain gauge is stuck to a load converter, whereby the detected pressure value is output to the controller 38. Alternatively, by a piezoelectric element, the pressure value may be detected.

The accelerator pedal arm 16 is integrally formed of, for example, a resin material, and comprises a rotor part 40 that is formed on one end side thereof and has the nearly circular shape, a pedal part 42 that is formed on the other end side thereof and receives pedaling force from a driver (not shown) of a vehicle, and a coupling arm 44 that connects the rotor part 40 and the pedal part 42.

The rotor part 40, as shown in FIG. 1, is provided so that one side surface thereof comes close to the inner wall surface of the cover member 24, and a first support shaft 46 is formed in the nearly central portion of the rotor part 40 so as to protrude to the inner wall surface of the cover member 24. The first support shaft 46 of the rotor part 40 is inserted into the pin hole 28b of the cover member 24, whereby the accelerator pedal arm 16 is held rotatably by the cover member 24 with the first support shaft 46 as a supporting point. Further, the invention is not limited to the case where the first support shaft 46 is inserted into the pin hole 28b of the cover member 24. For example, a convex part (not shown) protruding from the inner wall surface of the cover member 24 to the rotor part 40 is provided, and the convex part is inserted into a hole portion (not shown) formed in the rotor part 40, whereby the accelerator pedal arm 16 may be supported rotatably.

Figure 3:
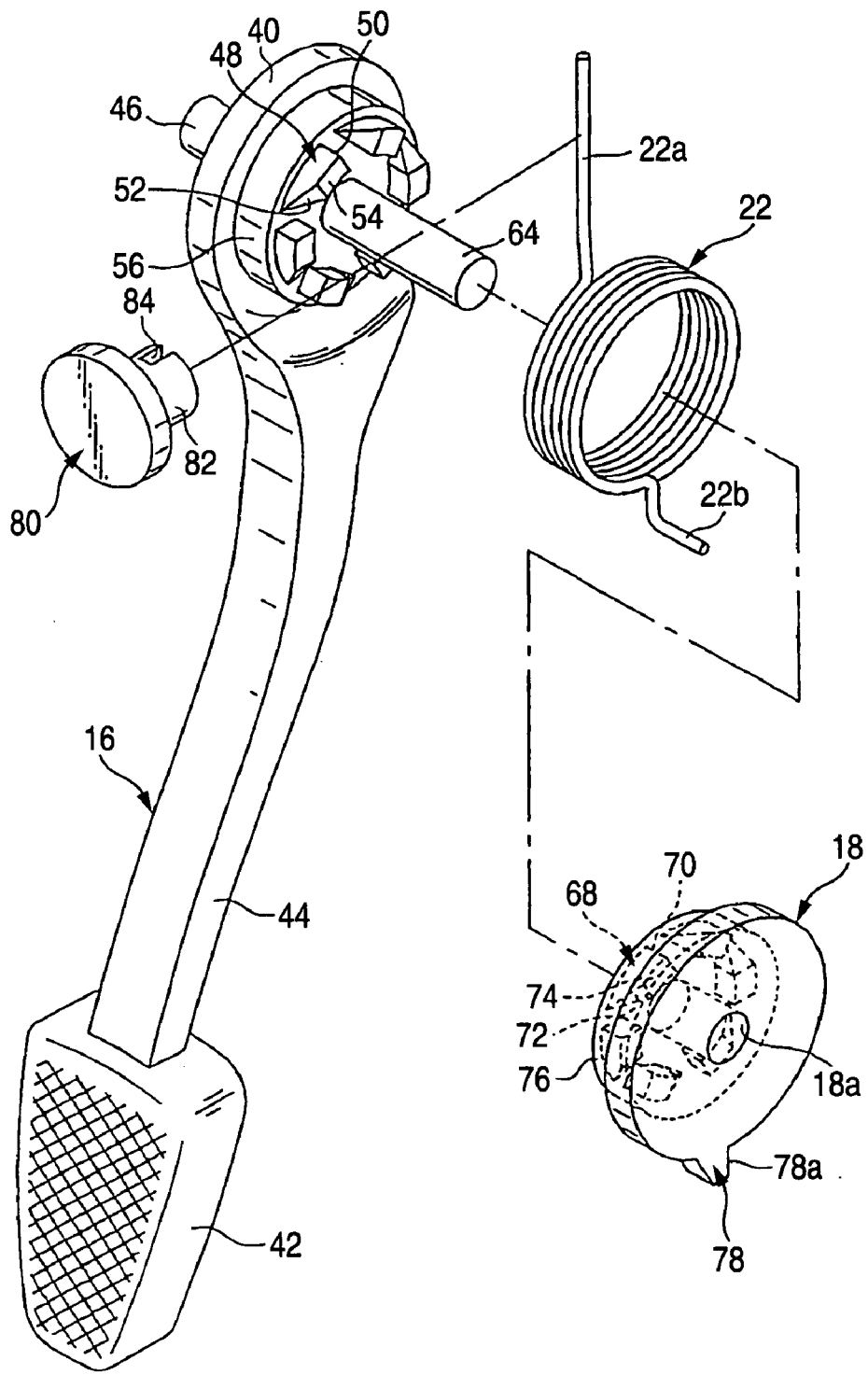
FIG. 3 is an exploded perspective view of an accelerator pedal arm, a interlocking member, and a torsion spring in FIG. 2.

Further, on the other side surface of the rotor part 40, as shown in FIG. 3, a second support shaft 64 is formed coaxially with the first support shaft 46 so as to protrude. This second support shaft 64 is formed so that its length becomes larger than the length of the first support shaft 46.

Further, on the other side surface of the rotor part 40, as shown in FIG. 3, plural tooth parts (first engaging part) 48 are formed annularly around the second support shaft 64. These plural (for example, six) tooth parts 48 are protrusively formed so as to be spaced in the circumferential direction of the other side surface of the rotor part 40.

Specifically, the shape of the single tooth part 48 is formed by an orthogonal surface 50 formed so as to be nearly orthogonal to the other side surface of the rotor part 40, a slant surface 52 formed so as to slant to the other side surface of the rotor part 40 at the predetermined angle, and a peripheral surface 54 that connects the end portion of the orthogonal surface 50 and the end portion of the slant surface 52, and is formed nearly in parallel to the other side surface. This slant surface 52 is formed in the same direction along the circumferential direction of the rotor part 40, for example, formed so as to slant to the other side surface of the rotor part 40 at an angle of 45°.

On the other hand, on the peripheral surface of the rotor part 40, a first annular attachment groove 56 having depression of the determined depth in the radius-in direction is formed. The first attachment groove 56 is formed so as to have the predetermined width from the end surface of the interlocking member 18 side toward the cover member 24 side in the axial direction of the first support shaft 46. To this first attachment groove 56, a torsion spring 22 is attached.

The coupling arm 44, as shown in FIGS. 2 and 4, extends downward of the peripheral surface 54 of the first rotor part 40 so as to become narrower, and extends downward while curving slightly in the direction (direction of an arrow A2 in FIG. 2) separating from an attachment surface 56 of the car body 12 in a state where it is locked by a first stopper 60 of the housing 14. Further, as shown in FIG. 1, the coupling arm 44 connects the pedal part 42 and the rotor part 40 in the shape of a straight line that is nearly parallel to the inner wall surface of the cover member 24.

As shown in FIGS. 2 and 4, on the inner wall surface of the housing 14, the first stopper 58 and a second stopper 60 are formed in positions where the coupling arm 44 comes into contact with the inner wall surface when the accelerator pedal arm 16 moves rotationally with the first support shaft 46 and the second support shaft 64 as a supporting point. The first stopper 58 is formed at the portion with which the coupling arm 44 comes into contact in an accelerator full closing state where the not-shown driver does not pedal on the accelerator pedal arm 16 (refer to FIG. 2), while the second stopper 60 is formed at the portion with which the coupling arm 44 comes into contact in an accelerator full opening state where the driver steps on the accelerator pedal arm 16 (refer to FIG. 4) Further, the first stopper 58 and the second stopper 60 respectively protrude from the inner wall surface of the housing 14 slightly, and are formed so as to be opposed to each other.

The pedal part 42, as shown in FIG. 1, is formed with larger width than the width of the coupling arm 44, and provided at the lower end portion of the accelerator pedal arm 16. In this case, the invention is not limited to the case where the accelerator pedal arm 16 is formed of a resin material. For example, only the coupling arm 44 may be formed of a metal material, and the rotor part 40 and the pedal part 42 may be formed of the resin material.

The interlocking member 18 is formed nearly circularly, and provided in the position opposed to the rotor part 40 of the accelerator pedal arm 16 in the housing 14. In the nearly central portion of this interlocking member 18, a through-hole 18a piercing from one side surface of the interlocking member 18 to the other side surface thereof is formed (refer to FIG. 3). Into the through-hole 18a, the second support shaft 64 of the accelerator pedal arm 16 is inserted. The second support shaft 64 is inserted into the pin hole 28a formed in the housing 14, whereby the interlocking member 18 enters a state where it is held rotatably by the housing 14. Namely, the interlocking member 18 moves rotatably with the second support shaft 64 as a supporting point.

Here, the invention is not limited to the case where the second support shaft 64 is inserted into the pin hole 28a of the housing 14. For example, a convex part (not shown) protruding from the inner wall surface of the housing 14 to the interlocking member 18 is provided, and the convex part is inserted into the through-hole 18a, whereby the interlocking member 18 may be held rotatably.

Further, one side surface of the interlocking member 18 is arranged in a position that is spaced away from the inner wall surface of the housing 14 by the predetermined space, that is, in a position having a clearance 66 (refer to FIG. 1). On the other hand, on the other side surface of the interlocking member 18, plural (for example, six) engagement grooves (second engaging part) 68 each having depression of the predetermined depth are formed annularly around the through-hole 18a. These plural engagement grooves 68 are formed so as to be spaced in the circumferential direction of the other side surface of the interlocking member 18. Each of these engagement grooves 68 is formed in the position opposed to the tooth part 48 of the accelerator pedal arm 16. Namely, the engagement grooves 68 are formed in the interlocking member 18 so that the number of them becomes the same as that of the tooth parts 48 formed at the rotor part 40.

Specifically, the shape of the single engagement groove 68 is, as shown in FIG. 3, similarly to the tooth part 48, formed by an orthogonal surface 70 formed so as to be nearly orthogonal to the other side surface of the interlocking member 18, a slant surface 72 that slants to the other side surface of at the predetermined angle and caves in, and an inner surface 74 that connects the end portion of the orthogonal surface 70 and the end portion of the slant surface 72, and is formed nearly in parallel to the other side surface. This slant surface 72 is formed so as to slant to the other side surface of the interlocking member 18 at an angle of 45°.

Into each engagement groove 66 of the interlocking member 18, each tooth part 48 of the rotor part 40 is inserted thereby to engage with the engagement groove 66. In this case, the side surface of the rotor part 40 and the side surface of the interlocking member 18 come into contact with each other, and the tooth part 48 engages with the engagement groove 68 so that the slant surfaces 52 and 72 of the tooth part 48 and the engagement groove 68 are opposed to each other and come into contact with each other, and the orthogonal surfaces 50 and 70 are opposed to each other and come into contact with each other. The plural tooth parts 48 and engagement grooves 68, as described later, function as a hysteresis mechanism.

In this case, the invention is not limited to the case where the tooth part 48 is formed at the rotor part 40 and the engagement groove 68 is formed in the interlocking member 18. For example, the tooth part 48 may be formed at the interlocking member 18 and the engagement groove 68 may be formed in the rotor part 40 thereby to engage the rotor part 40 and the interlocking member 18, or the tooth parts 48 may be formed respectively at the rotor part 40 and the interlocking member 18 thereby to engage the tooth parts 48 with each other.

Hereby, when the accelerator pedal arm 16 moves rotationally with the first support shaft 46 as a supporting point, the interlocking member 18 engaging with the accelerator pedal arm 16 integrally moves rotationally with the second support shaft 64 as a supporting point.

In the embodiment, as shown in FIG. 1, the rotor part 40 of the accelerator pedal arm 16 is arranged on the cover member 24 side that is the left side, and the interlocking member 18 is arranged on the housing 14 side that is the right side. However, the invention is not limited to this. On the contrary, the interlocking member 18 may be provided on the cover member 24 side, and the accelerator pedal arm 16 may be provided on the housing 14 side. Further, the rotor part 40 may be divided into two. In this case, the interlocking member 18 is engaged between the divided portions.

On the other hand, on the peripheral surface of the interlocking member 18, a second attachment groove 76 having depression of the determined depth in the radius-in direction is formed. The second attachment groove 76 is formed so as to face the first attachment groove 56 formed in the accelerator pedal arm 16, and have the predetermined width from the end surface of the accelerator pedal arm 16 side toward the inner wall surface side of the housing 14, which is nearly the same as the width of the first attachment groove 56. Further, the depth of the second attachment groove 76 is nearly the same as that of the first attachment groove 56.

When the tooth part 48 of the accelerator pedal arm 16 and the engagement groove 68 of the interlocking member 18 are engaged, the first attachment groove 56 and the second attachment groove 76 come close to each other, and the torsion spring 22 is attached so as to stride over the first attachment groove 56 and the second attachment groove 76. Namely, the first attachment groove 56 and the second attachment groove 76 function as the sole spring attachment groove.

This torsion spring 22 comprises a portion wound cylindrically that is attached to the first and second grooves 56 and 76, and an engagement end 22a that is one end of the wound portion. The engagement end 22a is arranged so as to be located on the first attachment groove 56 side, and extends linearly in the radius-out direction. The engagement end 22a of the torsion spring 22 is engaged with a guide member 80 attached into an attachment hole 36 of the housing 14.

On the other hand, the torsion spring 22 has at the other end thereof a lock end 22b that is arranged so as to be located on the second attachment groove 76 side. The lock end 22b is bent on the sidewall side of the second attachment groove 76 and locked in a locking part 78 protruding from the peripheral surface of the interlocking member 18. At this locking part 78, a locking wall 78a that is nearly orthogonal to the peripheral surface of the interlocking member 18 is formed, and the lock end 22b comes into contact with the locking wall 78a, whereby displacement in the circumferential direction of the torsion spring 22 is regulated. Namely, clockwise force of the rotational displacement (in the direction of an arrow A2) in FIGS. 2 and 4 is applied to the torsion spring 22 by its elastic force. Therefore, by regulating the lock end 22b that is the other end of the torsion spring 22 by the locking part 78, the displacement in the circumferential direction of the torsion spring 22 can be regulated.

The engagement end 22a and the lock end 22b of the torsion spring 22, as shown in FIGS. 2 and 4, are formed in positions symmetrical to each other about a center of the torsion spring 22. Specifically, the engagement end 22a of the torsion spring 22 is formed so as to extend toward the upper side of the housing 14 opposed to the guide member 80. On the contrary, the lock end 22b of the torsion spring 22 is formed so as to be located on the lower portion of the housing 14.

The guide member 80 provided in this attachment hole 36 is set nearly in the shape of a plane so that one end surface thereof comes into contact with the detection part 20. On the other end surface of the guide member 80, a protrusion part 82 that protrudes toward the interlocking member 18 side is formed. In the protrusion part 82, a guide groove 84 is formed linearly in the vertical direction that is nearly parallel to an axis of the accelerator pedal arm 16, and has depression of predetermined depth on the detection part 20 side. Through the guide groove 84, the engagement end 22a of the torsion spring 22 is engaged with the guide member 80.

Further, instead of that the guide member 80 and the detection part 20 with which the engagement end 22a of the torsion spring 22 is engaged are provided on the upper portion side of the housing 14 as described above, the guide member 80 and the detection part 20 may be provided on the inner wall surface of the housing 14 where the second stopper 62 is formed, thereby to engage the engagement end 22a of the torsion spring 22 with them.

Namely, in the torsion spring 22, the engagement end 22a that is one end portion is engaged into the guide groove 84 of the guide member 80 attached in the attachment hole 36 of the housing 14, and the lock end 22b that is the other end portion is locked in the locking part 78 of the interlocking member 18. Therefore, when the accelerator pedal arm 16 and the interlocking member 18 move rotationally, the engagement end 22a of the torsion spring 22 is regulated in displacement in the width direction of the housing 14 by the guide member 80.

Thus, the detection part 20 is in a held state between the inner wall surface of the attachment hole 36 and the guide member 80. Therefore, when the accelerator pedal arm 16 and the interlocking member 18 integrally moves rotationally, the detection part 20 is correspondingly pressed by the engagement end 22a of the torsion spring 22, whereby the press force is applied from the torsion spring 22 through the guide member 78 to the detection part 20.

The accelerator pedal device 10 according to the embodiment of the invention is basically constructed as described above. Next, an operation and a working effect of the accelerator pedal device 10 will be described. In the following description, the accelerator full closing state in which the driver does not pedal on the pedal part 42 of the accelerator pedal arm 16 is taken as an initial state (refer to FIG. 2).

Firstly, when opening (opening for acceleration) of a throttle valve 86 (refer to FIG. 5) is increased in order to accelerate a vehicle, a not-shown driver pedals on the pedal part 42 of the accelerator pedal arm 16 toward the attachment surface 58 side of the car body 12. Hereby, the accelerator pedal arm 16 moves rotationally with the first and second support shafts 46 and 64 as the support point counterclockwise (in the direction shown of an arrow A1) in FIG. 2. With this rotational movement, the interlocking member 18 engaged with the rotor part 40 of the accelerator pedal arm 16, similarly to the accelerator pedal arm 16, moves rotationally with the second support shaft 64 as the supporting point counterclockwise (in the direction of the arrow A1).

At this time, the interlocking member 18, by the torsion spring 22 provided on the first and second attachment grooves 56 and 76 of the accelerator pedal arm 16 and the interlocking member 18, is always biased in the direction of the arrow A2. Therefore, the slant surface 72 of the engagement groove 68 in the interlocking member 18 slides by the elastic force of the torsion spring 22 along the slant surface 52 of the tooth part 48 in the rotor part 40. In result, the interlocking member 18 moves along the axial direction of the second support shaft 64 in the direction separating from the rotor part 40 (in the direction of an arrow B1 in FIG. 1). Namely, the rotation drive force of the rotor part 40 is divided into the rotational force in the rotational direction and the axial force in the axial direction (directions of arrows B1 and B2) of the first and second support shafts 46 and 64.

Hereby, the side surface of the interlocking member 18 moves gradually in the axial direction (direction of the arrow B1) of the second support shaft 64 by the clearance 65, and lastly comes into contact with the inner wall surface of the housing 14. Therefore, hereafter, the side surface of the interlocking member 18, while coming into contact with the inner wall surface of the housing 14, moves rotationally. Hereby, between the interlocking member 18 and the inner wall surface of the housing 14, sliding resistance (friction) is produced. Therefore, like the conventional accelerator pedal device in which the accelerator pedal and the throttle valve are connected by the accelerator wire, the driver can pseudoly feel the sliding resistance of the accelerator wire in the pedal operating time. Note that the hysteresis generating mechanism is directly driven by the pedal force of the operator. In this case, so that the desired sliding resistance can be obtained between the housing 14 and the interlocking member 18, it is proper to set a material, surface treatment, surface roughness and contact area of the housing 14 and the interlocking member 18, and press load of the interlocking member 18 onto the housing 14.

Further, the sliding surface that causes the sliding resistance when the accelerator pedal arm 16 is rotationally moved is not limited to the case where it is composed of the side surface of the interlocking member 18 and the inner wall surface of the housing 14. The sliding surface may be composed of the side surface of the rotor part 40 of the accelerator pedal arm 16 and the inner wall surface of the cover member 24. Further, the sliding surfaces may be provided on the rotor part 40 of the accelerator pedal arm 16 and the interlocking member 18 respectively.

By the rotational movement of the interlocking member 18 in the direction of the arrow A1, the guide member 80 is pressed by the engagement end 22a of the torsion spring 22 locked by the interlocking member 18, and the guide member 80 is pressed toward the detection part 20 side at the predetermined pressure by the press force. Hereby, the detection part 20 composed of the pressure sensor converts the press force from the guide member 80 into an electrical signal and detects the signal, and its detection signal is output through the lead wire 34 from the terminal 32 of the connection part 30 to the controller 38 (refer to FIG. 5). At this time, since the driver is pedaling on the accelerator pedal arm 16 against the elastic force of the torsion spring 22, he can feel the reaction force similar to the reaction force biased by the return spring provided on the throttle valve in the conventional accelerator pedal device.

Figure 5:
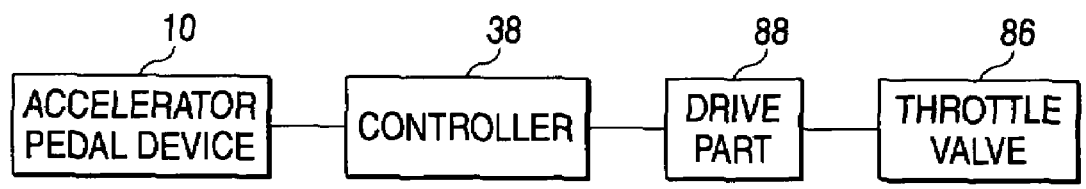
FIG. 5 is a schematic block diagram showing a signal transmission system till the pedaling amount of the accelerator pedal arm detected by the accelerator pedal device in FIG. 1 is transmitted as a detection signal to a throttle valve.

Next, as shown in FIG. 5, the controller 38 performs the operation processing on the basis of the detection signal, and thereafter, a drive part 82 (for example, stepping motor) is rotation-driven by the output signal from the controller 38 by the predetermined amount. Hereby, opening of the throttle valve 80 coupled to a drive shaft (not shown) of the drive part 82 is controlled, and the volume of intake air inspired in a cylinder room of an engine through the throttle valve 80 is controlled.

Further, on the contrary, in case that the driver relaxes pedaling on the pedal part 42 to reduce the opening of the throttle valve 86, he relaxes the pedaling force applied onto the accelerator pedal arm 16. Hereby, accelerator pedal arm 16 and the interlocking member 18 are pressed by the elastic force of the torsion spring 22 in the direction separating from the detection part 20 (in the direction of the arrow C2), and the accelerator pedal arm 16 and the interlocking member 18 move rotationally in the direction separating from the car body 12 (in the direction of the arrow A2).

At this time, as the press force applied from the torsion spring 22 through the guide member 80 to the detection part 20 becomes smaller, the pressure value detected by the detection part 20 becomes smaller. This pressure value is output as an electric signal through the connection part 30 to the controller 38, and thereafter transmitted to the drive part 82. Correspondingly to this pressure value, opening of the throttle valve 86 is controlled to become small under the drive action of the drive part 88. In result, the volume of intake air inspired in the cylinder room of the engine through the throttle valve 86 is controlled.

As described above, in the embodiment, the accelerator pedal arm 16 and the interlocking member 18 are integrally engaged, the torsion spring 22 is provided so as to stride over the peripheral surfaces of the accelerator pedal arm 16 and the interlocking member 18, the engagement end 22a that is the one end portion of the torsion spring 22 is engaged with the guide member 80 provided in the housing 14, and the lock end 22b that is the other end portion is locked in the interlocking member 18. Hereby, the pedaling amount of the accelerator pedal arm 16 can be directly detected as the press force applied by the torsion spring 22 through the guide member 80 by the detection part 20. Namely, compared with the case where the rotation amount of the accelerator pedal is detected by the conventional rotation angle sensor, the pedaling amount of the accelerator pedal arm 16 can be detected as the pressure value by the detection part 20 such as the pressure sensor at high accuracy, and assembly of the detection part 20 to the accelerator pedal device 10 can be also readily performed.

Further, since this torsion spring 22 has the function of supplying the pressure value corresponding to the pedaling amount of the accelerator pedal arm 16 to the detection part 20, the pedaling amount can be surely and easily detected simultaneously with the driver's pedaling operation.

Further, compared with the case where the rotation angle sensor is provided coaxially with the rotation shaft of the conventional accelerator pedal device, since the detection part 20 can be provided in the housing 14 of which the direction is the rotational direction of the accelerator pedal arm 16 and the interlocking member 18, the size in the width direction of the accelerator pedal device 10 can be reduced. Therefore, the degree of freedom in layout of the accelerator pedal arm 16 and the interlocking member 18 in the accelerator pedal device 10 can be increased.

Furthermore, since the size in the width direction of the housing 14 can be reduced, rigidity of the housing 14 can be heightened, so that rigidity of the accelerator pedal device 10 can be heightened as a whole.

Furthermore, the torsion spring 22 has the function of increasing and decreasing the press force onto the detection part 2 according to the pedaling amount of the accelerator pedal arm 16, and further has, apart from its function, the function of generating reaction force (friction) when the not-shown driver pedals on the accelerator pedal arm 16. Therefore, compared with the conventional accelerator pedal device, a feeling of physical disorder is not produced.

Further, the torsion spring 22 has three functions: a function of a pressure convertor that transmits the rotation displacement of the accelerator pedal arm and the interlocking member 18 as the press force to the detection part 20; a function of generating the reaction force when the driver pedals on the accelerator pedal arm 16; and a function of returning the accelerator pedal arm 16 to the initial position when the pedaling force onto the accelerator pedal arm 16 is relaxed. Therefore, the constitution of the accelerator pedal device 10 can be simplified, so that the size of the accelerator pedal device 10 can be reduced.

Further, since the detection part 20 can detect the press force on the basis of the elastic displacement of the torsion spring 22 in the circumferential direction, the detection part 20 does not require the movable portion that is necessary for the conventional rotation angle sensor, so that the size of the detection part 20 can be reduced.

Furthermore, in the accelerator pedal device 10, the accelerator pedal arm 16 and the interlocking member 18 can be manufactured separately from the detection part 20 such as the pressure sensor attached to the attachment hole 36 of the housing 14. Therefore, the detection part 20 can be previously unitized solely and manufactured, and it can be readily attached to the attachment hole 36 of the housing 14.

Further, after the accelerator pedal arm 16 and the interlocking member 18 have been arranged in the housing 14, the detection part 20 may be arranged in the housing 14.

Therefore, the unsteadiness of the rotation shaft produced in the rotation angle sensor of the conventional accelerator pedal device is removed, the relative positioning between the accelerator pedal arm 16 and the detection part 20 becomes unnecessary, and the assembly workability of the accelerator pedal device 10 can be improved. Namely, the detection part 20 is attached to the attachment hole 36 of the housing 14 so as to be connected to the lead wire 34 connected to the terminal 32 of the connection part 30, whereby the complicated position-matching work of the rotation angle sensor that has been performed in the conventional accelerator pedal device is not required.

Further, compared with the rotation angle sensor that has been adopted in the conventional accelerator pedal device, since the detection part 20 such as the pressure sensor has no movable portion, the detection part 20 has an advantage that it is superior in durability. On the other hand, also compared with the non-contact type rotation angle sensor that uses the Hall element, since the detection part 20 has no moveable portion, the detection part 20 has an advantage that it is superior in accuracy and durability.

More specifically, the non-contact type rotation angle sensor that uses the Hall element requires, as a detection device, a detected part (movable portion) on the side of a magnetic (for example, permanent magnet), and a detection part (fixed portion) on the Hall element side including the Hall element. Therefore, the non-contact type rotation angle sensor has a complication that exact position-matching between the detected part and the detection part is required. However, for the detection part 20 in the accelerator pedal device 10 according to the invention, it is not necessary to provide the detected part such as the movable magnetic, and the complicated work of position-matching between the detected part and the detection part is not necessary.

In the afore-described embodiment, the engagement parts of the hysteresis generating mechanism are formed on a side surfaces, which are orthogonal to the rotational axis of the accelerator pedal, of the pedal arm and the interlocking member, respectively, however, the present invention is not limited thereto. For example, the engagement part of the pedal arm side may be formed on a surface, which is parallel to the rotational axis of the acceleration pedal, so far as to divide the rotational force of the pedal arm into the rotational force of the interlocking member and the axial direction force of the interlocking member.

Note that in the above-described embodiment, the pressure sensor is provided on a side of the vehicle body near to a driver, the present invention is not limited. The pressure sensor may be provided on a side of the vehicle far from the driver.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. An accelerator pedal device, comprising:
   a body;
   an accelerator pedal rotatably supported on the body, and applying a pedaling force from a driver;

a torsion spring provided around a rotational axis of the accelerator pedal, and converting a rotational displacement of the accelerator pedal into a press force of the torsion spring;
a detection part provided on the body and detecting the press force applied by the torsion spring as a pressure value; and
a throttle valve control unit controlling an opening amount of a throttle valve in accordance with only the detected press force as the rotational displacement of the accelerator pedal.

2. The accelerator pedal device as set forth in claim 1, wherein the accelerator pedal comprises:
a pedal arm provided with a pedal portion, to which the pedaling force is applied, on a first end side;
an interlocking member engaged with a second end side of the pedal arm and rotating integrally with the pedal arm; and
a hysteresis generating mechanism comprising:
a first engagement part formed on the pedal arm; and
a second engagement part formed on the interlocking member so as to oppose to the first engagement part and engage with the first engagement part,
wherein when the pedal arm rotates, the hysteresis generating mechanism divides a rotation force of the pedal arm into rotation force of the interlocking member and axial force in an axial direction substantially orthogonal to a rotation direction of the interlocking member, and
the hysteresis generating mechanism generates frictional resistance on the accelerator pedal when the accelerator pedal is pedaling and also the accelerator pedal is returning therefrom.

3. The accelerator pedal device as set forth in claim 2, wherein a first end portion of the torsion spring is fixed to the pedal arm or the interlocking member, and a second end portion of the torsion spring is fixed to a detection part side of the body.

4. The accelerator pedal device as set forth in claim 2, wherein the first engagement part comprises a slant surface which is slant relative to a plane orthogonal to a rotational axis of the accelerator pedal, the second engagement part comprising a slant surface which is slant relative to the plane orthogonal to the rotational axis of the accelerator pedal, and the first engagement part contacts with the second engagement part on the respective slant surfaces.

5. The accelerator pedal device as set forth in claim 2, wherein at least one of protrusions is formed on either the first engagement part or the second engagement part, the protrusion comprising:
a slant surface which is slant relative to a plane orthogonal to a rotational axis of the accelerator pedal; and
an orthogonal surface which is orthogonal to the plane orthogonal to the rotational axis of the accelerator pedal;
wherein the slant surface and the orthogonal surface are arranged around the rotational axis of the accelerator pedal, and at least one of grooves is formed on either the second engagement part or the first engagement part, of which shape corresponds to a shape of the protrusion so as to engage with the protrusion.

6. The accelerator pedal device as set forth in claim 2, wherein a friction surface is formed on either the pedal arm or the interlocking member, a swollen portion is formed on the body so as to oppose to the friction surface, and when the accelerator pedal does not rotate, a predetermined clearance is defined between the friction surface and the swollen portion and when the accelerator pedal rotates, the friction surface slides against the swollen portion while the friction surface contacting with the swollen portion.

7. The accelerator pedal device as set forth in claim 2, wherein the torsion spring is disposed between the pedal arm and the interlocking member.

8. The accelerator pedal device as set forth in claim 2, wherein a first end of the torsion spring is engaged with either the pedal arm or the interlocking member, and a second end of the torsion spring is engaged with the body.

9. The accelerator pedal device as set forth in claim 2, wherein the pedaling force drives the hysteresis generating mechanism to generate the frictional resistance.

10. The accelerator pedal device as set forth in claim 1, wherein the torsion spring is arranged coaxially with the center of the rotational axis of the pedal arm, and the elastic force of the torsion spring biases the accelerator pedal in the direction where the accelerator pedal is returned to an initial position to which the pedaling force is not applied.

11. The accelerator pedal device as set forth in claim 1, wherein the detection part comprises a pressure sensor being capable of converting the pressure value of the press force into an electric signal, the pressure sensor is attached to an attachment hole formed on the body, and a wiring connected to the pressure sensor and a connection terminal part connected to the wiring are formed integrally with the body.

12. The accelerator pedal device as set forth in claim 1, wherein the torsion spring applies reaction force against the pedaling force of the driver.

13. The accelerator pedal device as set forth in claim 1, wherein the accelerator pedal further comprising:
a guide member transmitting the press force of the torsion spring to the detection part, comprising:
a first surface with which a first end of the torsion member abuts; and
a second surface pressing the detection part due to the press force of the torsion spring.

14. A vehicle comprising the accelerator pedal device as set forth in claim 1.

15. An accelerator pedal device, comprising:
a body;
an accelerator pedal rotatably supported on the body, and applying a pedaling force from a driver the accelerator pedal comprises:
a pedal arm provided with a pedal portion, to which the pedaling force is applied, on a first end side;
an interlocking member engaged with a second end side of the pedal arm and rotating integrally with the pedal arm; and
a hysteresis generating mechanism comprising:
a first engagement part formed on the pedal arm; and
a second engagement part formed on the interlocking member so as to oppose to the first engagement part and engage with the first engagement part,
wherein when the pedal arm rotates, the hysteresis generating mechanism divides a rotation force of the pedal arm into rotation force of the interlocking member and axial force in an axial direction substantially orthogonal to a rotation direction of the interlocking member, and
the hysteresis generating mechanism generates frictional resistance on the accelerator pedal when the accelerator pedal is pedaling and also the accelerator pedal is returning therefrom;
a torsion spring provided around a rotational axis of the accelerator pedal, and converting a rotational displacement of the accelerator pedal into a press force of the torsion spring;

a detection part provided on the body and detecting the press force applied by the torsion spring as a pressure value; and a throttle valve control unit controlling an opening amount of a throttle valve in accordance with the detected pressure value.

16. The accelerator pedal device as set forth in claim 15, wherein a first end portion of the torsion spring is fixed to the pedal arm or the interlocking member, and a second end portion of the torsion spring is fixed to a detection part side of the body.

17. The accelerator pedal device as set forth in claim 15, wherein the first engagement part comprises a slant surface which is slant relative to a plane orthogonal to a rotational axis of the accelerator pedal, the second engagement part comprising a slant surface which is slant relative to the plane orthogonal to the rotational axis of the accelerator pedal, and the first engagement part contacts with the second engagement part on the respective slant surfaces.

18. The accelerator pedal device as set forth in claim 15, wherein at least one of protrusions is formed on either the first engagement part or the second engagement part, the protrusion comprising:

a slant surface which is slant relative to a plane orthogonal to a rotational axis of the accelerator pedal; and an orthogonal surface which is orthogonal to the plane orthogonal to the rotational axis of the accelerator pedal;

wherein the slant surface and the orthogonal surface are arranged around the rotational axis of the accelerator pedal, and at least one of grooves is formed on either the second engagement part or the first engagement part, of which shape corresponds to a shape of the protrusion so as to engage with the protrusion.

19. The accelerator pedal device as set forth in claim 15, wherein a friction surface is formed on either the pedal arm or the interlocking member, a swollen portion is formed on the body so as to oppose to the friction surface, and when the accelerator pedal does not rotate, a predetermined clearance is defined between the friction surface and the swollen portion and when the accelerator pedal rotates, the friction surface slides against the swollen portion while the friction surface contacting with the swollen portion.

20. The accelerator pedal device as set forth in claim 15, wherein the torsion spring is disposed between the pedal arm and the interlocking member.

21. The accelerator pedal device as set forth in claim 15, wherein a first end of the torsion spring is engaged with either the pedal arm or the interlocking member, and a second end of the torsion spring is engaged with the body.

22. The accelerator pedal device as set forth in claim 15, wherein the pedaling force drives the hysteresis generating mechanism to generate the frictional resistance.

* * * * *